United States Patent
Huysmans

(10) Patent No.: US 11,292,078 B2
(45) Date of Patent: Apr. 5, 2022

(54) SYSTEM FOR AND METHOD OF LINKING BY FRICTION WELDING A FIRST PIECE OF STEEL TO A SECOND PIECE OF STEEL WITH USE OF NI-BASED ALLOYS ADAPTER

(71) Applicant: Laborelec CVBA, Linkebeek (BE)

(72) Inventor: Staf Huysmans, Keerbergen (BE)

(73) Assignee: Laborelec CVBA, Linkebeek (BE)

( * ) Notice: Subject to any disclaimer, the term of this patent is extended or adjusted under 35 U.S.C. 154(b) by 0 days.

(21) Appl. No.: 17/176,384

(22) Filed: Feb. 16, 2021

(65) Prior Publication Data
US 2021/0308785 A1   Oct. 7, 2021

Related U.S. Application Data

(63) Continuation of application No. 15/555,647, filed as application No. PCT/EP2016/054560 on Mar. 3, 2016, now abandoned.

(30) Foreign Application Priority Data

Mar. 5, 2015   (EP) ..................................... 15157893

(51) Int. Cl.
*B23K 20/16*   (2006.01)
*B23K 20/12*   (2006.01)
(Continued)

(52) U.S. Cl.
CPC ............ *B23K 20/16* (2013.01); *B23K 20/121* (2013.01); *B23K 20/129* (2013.01);
(Continued)

(58) Field of Classification Search
CPC .... B23K 20/16; B23K 20/121; B23K 20/129; B23K 20/227; B23K 2103/18; B23K 2103/04; B33Y 10/00; B22F 3/1055
See application file for complete search history.

(56) References Cited

U.S. PATENT DOCUMENTS 4,333,671 A   6/1982   Holko
6,308,882 B1  10/2001  Shuster et al.
(Continued)

FOREIGN PATENT DOCUMENTS

CN   104014928 A   9/2014
DE   19953079 A1   5/2001

OTHER PUBLICATIONS

International Search Report and Written Opinion dated Jun. 14, 2016 for PCT/EP2016/054560 Filed Mar. 3, 2016. pp. 1-11.
(Continued)

*Primary Examiner* — Anthony J Zimmer
*Assistant Examiner* — Ricardo D Morales
(74) *Attorney, Agent, or Firm* — Dinsmore & Shohl, LLP

(57) ABSTRACT

A system is provided, comprising a two-sided adapter, made of a Ni-based alloy, that is connected at each of the two sides with a different type of metal, e.g. steel, and wherein the connection of the different types of metal, e.g. steel with the adapter is characterized in that it is achieved at least in part by use of friction welding. A method for linking different types of metal, e.g. steel by using a two-sided adapter as an intermediate, wherein at least one of the adapter-metal (e.g. steel) connections is made by means of friction welding, is also provided.

20 Claims, 6 Drawing Sheets

(51) Int. Cl.
  *B23K 20/227* (2006.01)
  *B23K 103/04* (2006.01)
  *B23K 103/18* (2006.01)
  *B22F 10/20* (2021.01)
  *B33Y 10/00* (2015.01)

(52) U.S. Cl.
  CPC ............ *B23K 20/227* (2013.01); *B22F 10/20* (2021.01); *B23K 2103/04* (2018.08); *B23K 2103/18* (2018.08); *B33Y 10/00* (2014.12)

(56) References Cited

U.S. PATENT DOCUMENTS

| | | | |
|---|---|---|---|
| 7,562,807 | B2 | 7/2009 | Coleman et al. |
| 7,874,471 | B2 * | 1/2011 | Fairchild ............... B32B 15/011 228/112.1 |
| 2010/0119870 | A1 | 5/2010 | Nojiri et al. |
| 2010/0233501 | A1 | 9/2010 | Messer et al. |
| 2014/0252198 | A1 | 9/2014 | Johnston, Jr. et al. |

OTHER PUBLICATIONS

International Preliminary Report dated Sep. 5, 2017 for PCT/EP2016/054560 Filed Mar. 3, 2016. pp. 1-7.

Extended European Search Report dated Sep. 17, 2015 for EP15157893.7 Filed Mar. 5, 2015. pp. 1-7.

Friel et al. ("Power ultrasonics for additive manufacturing and consolidating of materials." In Power Ultrasonics, pp. 313-335. Woodhead Publishing, 2015) (Year: 2015).

Fukumoto et al. ("Friction welding of Ti Ni alloy to stainless steel using Ni interlayer." Science and Technology of Welding and Joining 15.2 (2010): 124-130.) (Year: 2010).

* cited by examiner (a)            (b)

FIG 3
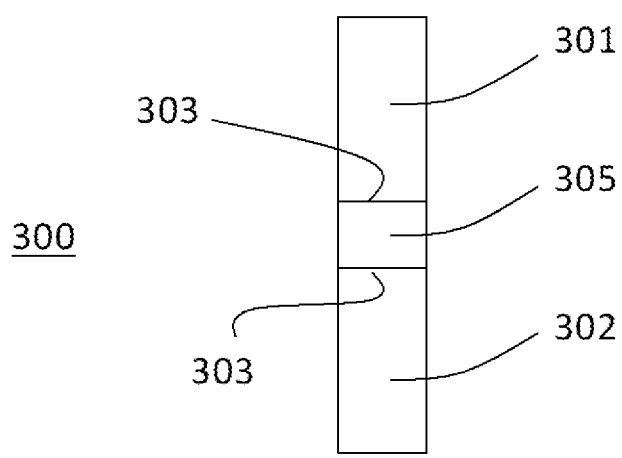
FIG 4
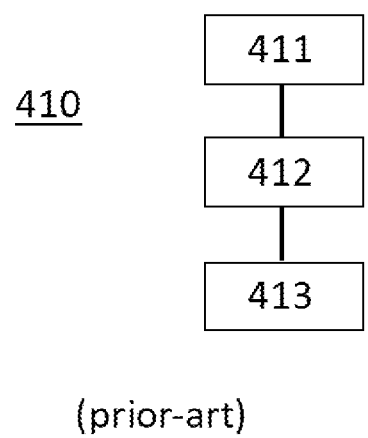
(prior-art)
FIG 5
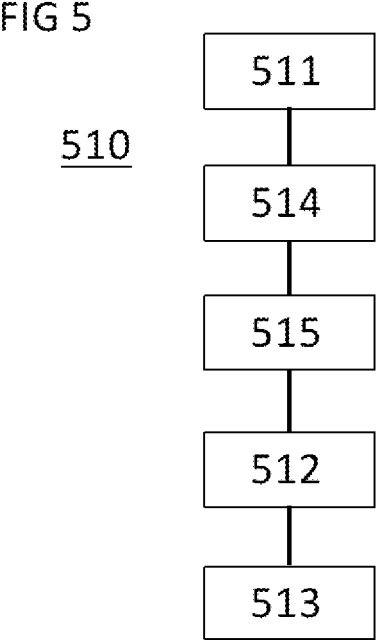
(a)
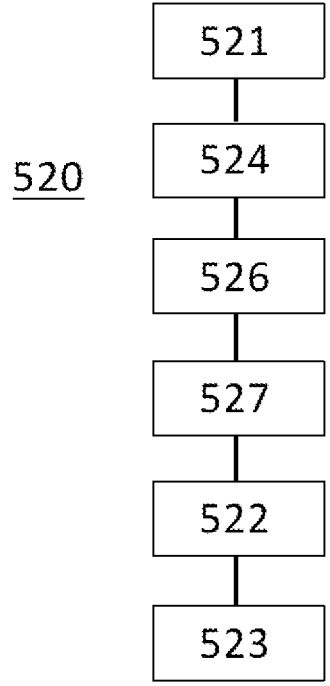
(b)

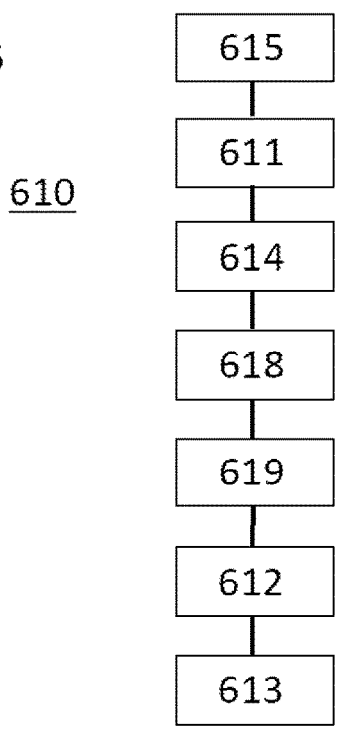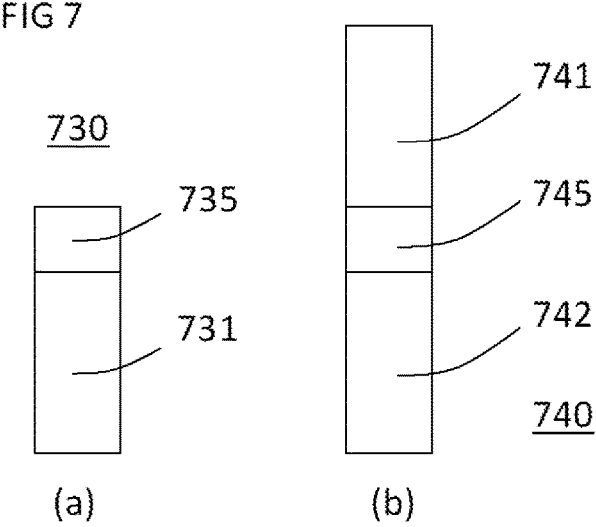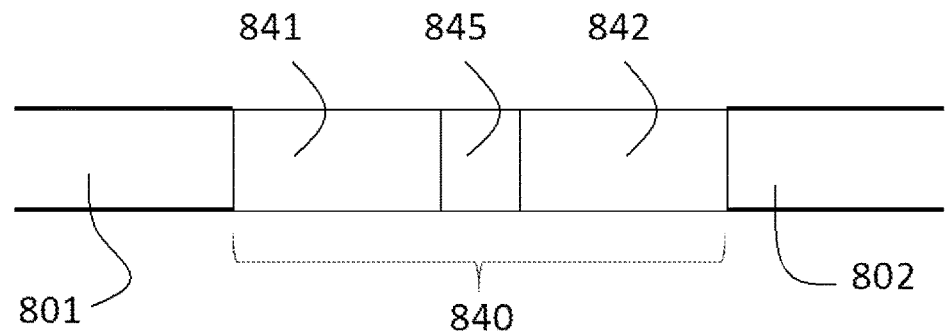

(a)  (b)

FIG 11
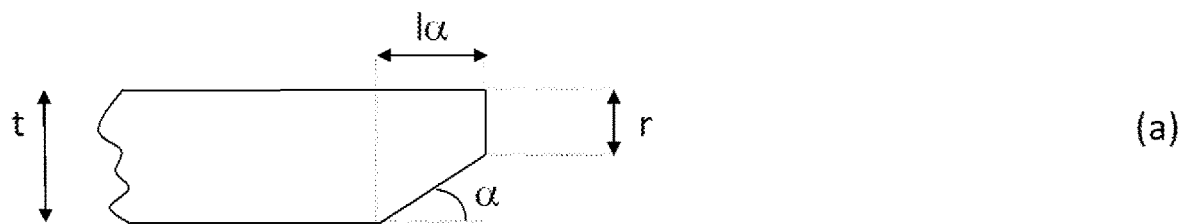
(a)
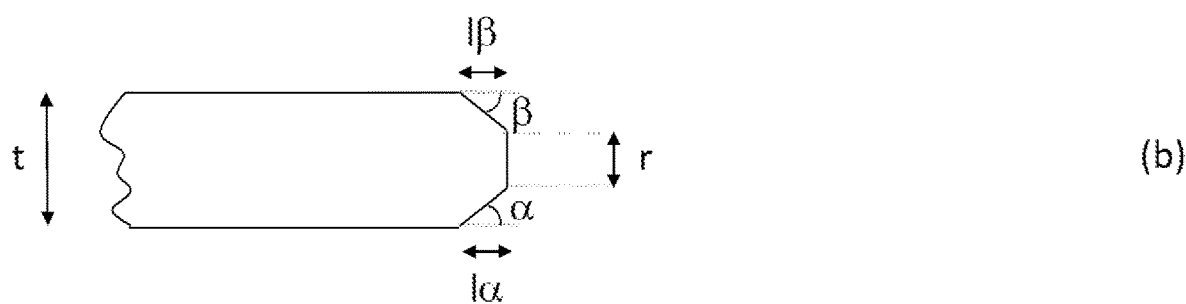
(b)
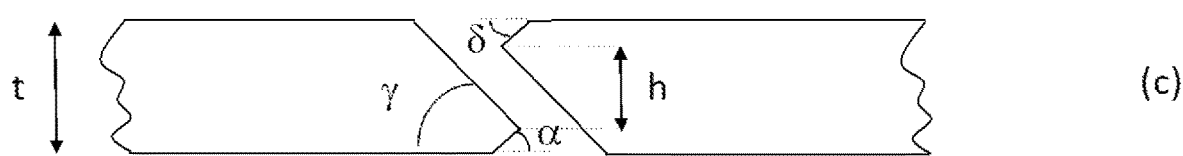
(c)

FIG 12
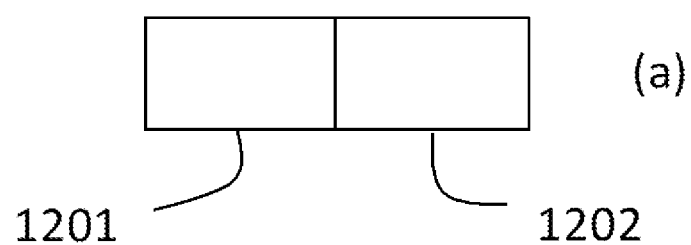
(a)
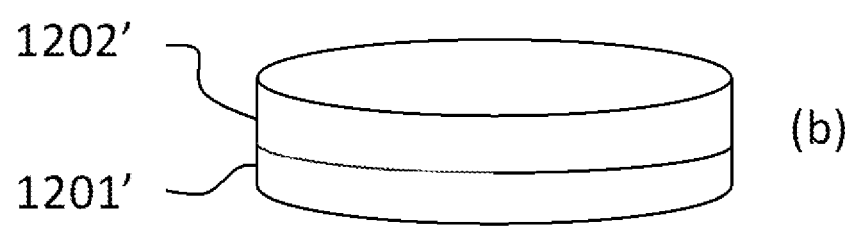
(b)
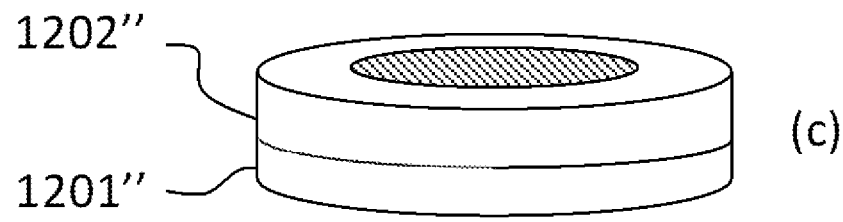
(c)

SYSTEM FOR AND METHOD OF LINKING BY FRICTION WELDING A FIRST PIECE OF STEEL TO A SECOND PIECE OF STEEL WITH USE OF NI-BASED ALLOYS ADAPTER

CROSS-REFERENCES TO RELATED APPLICATIONS

This application is a continuation of U.S. patent application Ser. No. 15/555,647, filed Sep. 5, 2017, which is a national-stage application under 35 U.S.C. § 371 of International Application No. PCT/EP2016/054560, filed Mar. 3, 2016, which international application claims benefit of priority to European Application No. 15157893.7, filed Mar. 5, 2015.

FIELD OF THE INVENTION

The invention relates to methods for connecting of materials, at least in part by use of welding, selected materials therefore, resulting connected systems and various use cases.

BACKGROUND OF THE INVENTION

The design of new USC power plants of the 600° C.-700° C. technology (especially at high pressure e.g. 300 bar or higher) requires new materials with excellent properties at high temperatures such as creep rupture strength, and resistance respectively related to oxidation, corrosion and fatigue. As a result formerly used high temperature (and high pressure) materials have limited characteristics and needed to be replaced by 9/12% Cr steels and advanced austenitic stainless steels. Further using old generation steels at the above mentioned high steam parameters would significantly increase the design of the tubes' wall thickness, and hence raise weight, cost of manufacturing, thermal stress and fatigue. For an improved oxidation and corrosion resistance Cr-alloyed steels, e.g. 25% Cr austenitic stainless steel, are maintained. The consequence of using different materials, for example 25% Cr austenitic stainless steel and 9% Cr martensitic steel, in a USC power plant results in unavoidable Dissimilar Metal Welds (DMWs) between components. For different components, different materials are chosen, not only from an economical point of view, but also because of important differences in the characteristics. Martensitic steel for instance is from an economical perspective preferably used as much as possible, while higher Cr-alloyed austenitic stainless steel, representing better corrosion and oxidation resistance, is much more sensitive for expansion at high temperatures—although being able to withstand such high temperatures. Amongst the differences in mechanical/technological properties between 9/12% Cr steels and advanced austenitic stainless steels, thermal expansion is considered one of major difficulties to overcome during service. The advanced martensitic and austenitic stainless steels are the new and improved versions of the formerly known martensitic steels, e.g. X20, and austenitic stainless steels, e.g. Tp321, Tp347H, Tp304H, wherein the improvement lays in the fact that for advanced martensitic steels a higher creep resistance is present, whereas for austenitic steels there is even so a better corrosion and oxidation resistance determined. Currently the DMWs are welded using conventional welding processes and a number of potential filler metals, mostly Ni-based are used. With conventional welding is meant the classical or standard way of joining together metal parts by melting and fusing, whereas the metal parts are being joined and a filler metal is applied. The long-term characteristics of these DMWs are formation of type I carbides in the fusion line, carbon depleted zones in the heat affected zone, and the phenomenon of thermo-mechanical fatigue due to a significant difference in thermal expansion coefficient. These type I carbides are at the origin of premature failures during service exposure. Literature and own experiences are ranging from a few thousand hours, or e.g. 2500 h, up to 80.000 h. It is understood that life of these DMWs is limited and on average a life of 20 to 30.000 h is commonly projected. The exact lifetime is difficult to forecast while depending of several parameters like stress states, cycling effects etc. It needs to be considered that in modern USC power plants roughly 5000 DMWs are present.

Rotational friction welding is well known for welding heavy-duty components such as e.g. critical aircraft engine components (jet compressor wheels), camshafts and axle tubes. It is not a fusion welding methodology but rather a solid-state process (cold weld). The advantage of friction welding is that in the use described above no fusion is obtained and no filler metals are required. Another advantage is that it is a simple and strictly controlled welding mechanism where welds are made within very short time (i.e. typically less than 1 minute). This makes the process ready for production welding of large series of components.

AIM OF THE INVENTION

The invention aims at providing methods for connecting of materials, at least in part by use of welding, as well as providing selected materials therefore, including resulting connected systems, suited for the heavy duty use cases described above.

SUMMARY OF THE INVENTION

In a first aspect of the invention is provided a system, comprising: a two-sided adapter, made of a Ni-based alloy, connected to either a first piece of metal, e.g. steel at one side of the two-sided adapter, and/or to a second piece of metal, e.g. steel at the other side of the two-sided adapter, wherein the first and second piece differ in at least one chemical or physical parameter; wherein the connection of at least the first or the second piece with the adapter is characterized in that it is made by use of friction welding. Note that therefore various combinations of connections are possible as long as the two-sided adapter is connected to one piece of metal, e.g. steel. The term connected is defined as being fixed or else joined, and for which welded is interpreted as an example. Analogue is the term connection referring to either a fixing or a joining contact, amongst which a welding contact is given as an example.

In a second aspect of the invention is provided a method for linking a first piece of metal, e.g. steel, to a second piece of metal, e.g. steel, wherein the first and second piece differ in at least one chemical or physical parameter, the method comprises the steps of (i) providing a connection between the first piece and one side of a two-sided adapter, made of an Ni-based alloy; and (ii) providing a connection between the second piece and the other side of the two-sided adapter, wherein at least for one of the steps (i) or (ii) friction welding is used. The term linking is defined as indirectly connecting by means of adding an intermediate piece in between, a so-called two-sided adapter.

In an embodiment of the first and second aspect of the invention the first piece of steel has a Cr content between 8 and 13% and the second piece of steel has a Cr content between 17 and 35%.

In an embodiment of the invention one of the steps (i) or (ii) comprises of welding, preferably laser beam welding the first or second piece to one or the other side of a two-sided adapter.

In an alternative embodiment of the invention one of the step (i) or (ii) comprises of additive manufacturing on the first or second piece of the two-sided adapter, thereby connecting the first or second piece to one or the other side of the two-sided adapter.

DESCRIPTION OF THE DRAWINGS

FIG. 3 illustrates a connecting system in accordance with the present invention comprising martensitic steel, that is friction welded to a Ni-alloy, made in advance by means of additive manufacturing, and that is further friction welded to austenitic stainless steel.

FIG. 4 illustrates the prior-art, i.e. a direct joining method characterized by friction welding martensitic steel to austenitic stainless steel.

FIG. 5 illustrates a connecting method in accordance with the present invention (a) comprising of laser beam welding a Ni-alloy onto martensitic steel, followed by friction welding that Ni-alloy onto austenitic stainless steel, (b) comprising of additive manufacturing a Ni-alloy onto martensitic steel, followed by friction welding that Ni-alloy onto austenitic stainless steel.

FIG. 6 illustrates a connecting method in accordance with the present invention comprising of additive manufacturing a Ni-alloy, followed by friction welding that Ni-alloy at one side onto martensitic steel, and at the other side onto austenitic stainless steel.

FIG. 7 shows (a) two-piece spacer comprising of martensitic or austenitic stainless steel, and a Ni-alloy respectively in accordance with the present invention, (b) a three-piece spacer comprising of martensitic steel, a Ni-alloy and austenitic stainless steel in accordance with the present invention.

FIG. 8 shows schematically in accordance with the present invention, a power plant tube in martensitic steel, which is conventionally welded to a three-piece spacer tube, in turn conventionally welded to a power plant tube in austenitic stainless steel.

FIG. 11 illustrates joint configurations or joint types of tubes in accordance with the present invention.

FIG. 12 schematically shows the present invention aspect of friction welding combined with respectively forging and piercing process.

DETAILED DESCRIPTION

Figure 1:
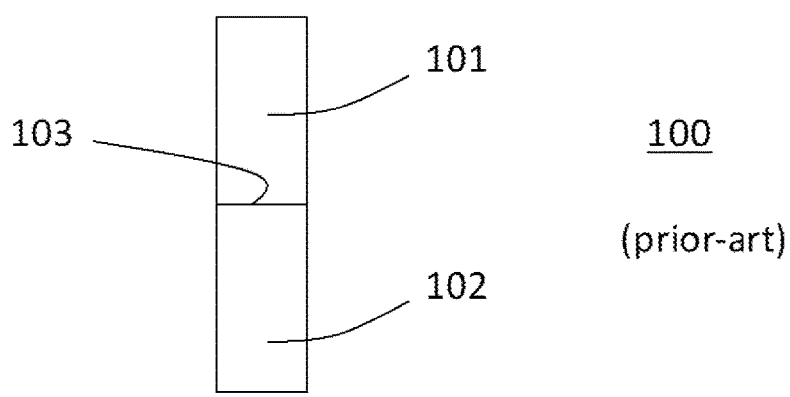
FIG. 1 illustrates in accordance with the prior-art, a direct joining system characterized by means of friction welding martensitic steel to austenitic stainless steel.

The invention provides the understanding that, when one requires connecting two dissimilar materials, especially metals, for instance by use of welding techniques, that need to be used in connected mode, in harsh conditions, either represented in terms of high temperature, high pressure or the occurrence of frequent thermal cycles, or corrosion, and most often combinations of those conditions, that then the used connecting technique has to be selected and optimized therefore. Note that selecting each of the materials is often not possible as they are selected as suited for the place they are used mostly without considering ad initio the connecting technique (and issues thereof) as described further.

An exemplary situation of the above is found in power plants, where steam temperatures above 600 degrees Celsius or even temperatures above 700 degrees Celsius occur, often in combination with pressures equal or higher than 300 bar. Moreover, optimal usage of such power plants, require operating such plants at changing operating conditions, resulting in cyclic behaviour of the conditions, especially temperature, wherein various and at some places connected materials used in the power plants are present, in particular the used steel as applied for instance in steam tubing.

Indeed when connecting two materials, having different mechanical/technological properties such as the thermal expansion coefficient and/or chemical composition, especially by means of connection (welding or joining) techniques, where connecting (welding or joining) occurs at high temperatures, this will result in differences in thermal expansion and/or migration of some elements of one material towards the other, particularly after a certain operating or service time, leading to weakness in the one material. Finally this leads to a weld (or weld area, such as e.g. fusion line or heat affected zone) of too low properties, essentially expressed in a too low amount of normal operating hours, which becomes extremely problematic in the example of power plants, where a few thousands (e.g. 2000, 3000, 4000), up to 5000, of welded tubes are used. It is moreover noted that this number of welded tubes is the actual situation, and hence might change over the years and e.g. further increase (as applicable to future USC, NPP, CSP . . . power plants). Minimal normal operating hours above 200.000 hours are aimed at. A power plant is generally designed for 200.000 h operation. Although early breakdown has occurred at operating hours between 2500 h and 80.000 h, due to particular stress state or dynamic loading.

In the state of the art of welding steel tubes conventional fusion type welding is used for connecting tubes of advanced austenitic and martensitic steel, hence in service suffering from the above mentioned issues due to their difference in thermal expansion coefficient and different Cr contents. Because of this latter, carbon migration will occur from the martensitic steel with lower Cr percentage towards the austenitic stainless steel, wherein Cr carbides are formed resulting in a carbon-enriched band at the fusion line. Different carbides form and can align creep cavities to cause premature creep failures. The carbon-depleted zone in martensitic steel has low creep strength, often resulting into creep failure.

Known approaches attempting to cure the above mentioned problem, while continuing usage of conventional fusion type welding, use Ni-based filler metals generally including post weld heat treatments (PWHT). The choice for Ni-basis in filler metals is mainly nourished by two phenomena, being carbon migration on one hand, and thermal expansion on the other. However, the Ni-based barrier for carbon migration, typically occurring when conventional welding different Cr-alloyed steels, doesn't seem to be full proof, due to the presence of type I or II carbides at the fusion line.

It is the contribution of this invention to understand that for the harsh conditions explained above, continued usage of conventional fusion type welding is no longer appropriate. It is the contribution of this invention to take a deliberate choice towards another nonconventional welding or connecting technique, especially for use of the connected materials in the power plant environment as described and even more in particular for use on steel (hollow) tubes therefore. Indeed, when selecting another type of welding, the final use, here expressed in that the steam must flow optimally through the tubes, including at the connections, has to be taken into account. Typically one sets such condition as direct requirement for the welded tubes (hence reducing further post processing on the tube internals and/or externals as this may invoke extra costs or issues, e.g. by choosing a particular optimum in joint type configuration).

Although it is known that friction welding will lead to undesirable and even unacceptable burrs or protrusions (as they occur both to the exterior and interior side of tubes), in the invention the use of friction welding is still retained as viable solution by alleviating the direct requirement as explained above and allowing for possible post processing. The invention overcomes the prejudice against use thereof by applying an ab initio global thinking about the problem, taking the technical operating conditions of the power plants into consideration. Instead of searching for further process windows within the use of known techniques (e.g. use of Ni based fillers), the invention makes an abrupt different choice for the field of use considered, being hollow tubes (in the examples/embodiments mentioned tube material thicknesses varying typically between 4, 6 to 8 mm, however 10 mm or even 15 mm could also be interpreted under this invention), especially for the power plants outlined above.

The invention however has further contributions. Indeed while the selection of technique is inspired by considering the temperatures as occurring during the connecting process, which are higher for the conventional fusion welding than for the friction welding, the invention indicates that even when applying the friction welding technique, temperatures might be too high to achieve a sufficiently good weld, and for instance lead to hard and/or brittle martensitic material and/or still C-migration (be it less). The invention hence brings forward the consideration that just changing welding process, especially by the alternative with a lower temperature, is not sufficient, and that the final outcome, for instance in terms of hardness, is still not sufficient. Moreover, while typically (also for the conventional approach) in such circumstances one might seek for further process windows to cure the above, for example in case of too high hardness being resolved by applying PWHT, the invention further selects a fundamental solution to the problem.

It is a contribution of the invention to elect the choice of using a further material, to tackle the (unexpected still too high consequence) difference between the materials in terms of thermal expansion coefficient, Cr percentages and hence C-migration phenomena.

Recall that an exemplary embodiment of the invention is to connect martensitic and austenitic stainless steel, martensitic steel having 9-12% Cr content, or percentages slightly lower or higher within a margin of + or −1%, and austenitic stainless steel having typically between 18-25% Cr content, however up to 35% or even higher Cr content is not particularly excluded, while depending on further development and feasibility of austenitic stainless steel. It is further noted that carbon migration can also appear between other dissimilar metals, such as for instance bainitic steel and martensitic steel wherein percentages of e.g. 2¼% Cr for bainitic steel and 9-12% Cr for martensitic steel respectively need to be joined. Hence, the solution as searched for according to the present invention, is not necessarily exclusively for joining martensitic steel with austenitic stainless steel, but is potentially also applicable for other dissimilar metals, and thus by default not excluded for other joined types of steel, particularly when representing a large difference in Cr content amongst each other.

In essence the purposely defined context of the invention determines that the further material should be selected in terms of difference in % of Cr and in terms of thermal expansion coefficient in that for the temperatures as reached by use of friction welding (still going beyond 800 degrees Celsius but far below the 1400 degrees Celsius as found in fusion welding) yields the desired performance for the defined harsh condition use.

It is an aspect of the invention to present Ni-based alloys (in a particular embodiment EPRI P87 alloy) as selected further material for use as adapter between two other dissimilar materials. This choice requires again overcoming of a serious prejudice.

Indeed when seeking a suitable adapter one thinks about components available in solid material fixed format such that one can make an adapter tube by use of conventional material processing techniques. However, while considered extremely suitable for the context considered as material, today EPRI P87 alloy is not available in this way but only in thin wire and hence unconventional material processing techniques like laser beam buttering or additive manufacturing, to create the adapter are required. It is again the contribution of the invention to recognize that the cost and technical implications thereof (which might be overcome in the future when EPRI P87 alloy may become available in a more suitable way, i.e. for instance in form of powder metallurgy) still don't outweigh the advantages posed by the technical considerations of the defined context.

The invented selection of combined friction welding and EPRI P87 alloy (which can also be used in fusion welding by the way) further benefits from the advantages (as described above and in addition reduced residual stress levels and optimal alignment avoiding bending moments) of friction welding in that such process is highly automated and hence less affected in process variability, i.e. operator influence. The EPRI P87 alloy is specifically developed with Cr content equal to that of martensitic steel (9%), including having similar carbon content and a comparable thermal expansion as of martensitic steel. With the high ductility characterizing Ni-alloys, P87 may absorb stress during creep-fatigue loading.

Alternatively, instead of EPRI P87 alloy, other Ni-based alloys such as A617 alloy or A82 alloy are also suitable. The advantage of using one of these latter alloys is for example the fact that A617 and A82 are more common, and hence directly and standard available for use. However, these alternatives have higher Cr content than EPRI P87 and therefore will still represent some remaining carbon migration, being entirely eliminated in case of using EPRI P87. On the other hand, whenever friction welding is applied, A617 and A82 are likely suitable due to low residual stress levels induced after welding. Compared to conventional welding, there is less risk for stress relaxation cracking as a result of residual stress.

Note that the invention also deliberately chooses the use of the automated friction welding on tubes and the steam flow conditions as described above although a little more critical operating thereof, due to the need for having protrusion free hollow tubes, might be required therefore.

An embodiment of the invention hence provides for a Ni-based transition piece, comprising: a first piece made of martensitic steel; a second piece made of austenitic stainless steel; and a two-sided adapter, made of e.g. EPRI P87 alloy, A617 alloy or else A82 alloy, connected at one side to the first piece and at the other side to the second piece, wherein connecting the first piece is achieved by means of (laser beam) welding or the two-sided adapter is additive manufactured, and wherein connecting the second piece is achieved by use of friction welding.

In an embodiment thereof said pieces are tubes. Other combinations of transition pieces can be made with either only the first or otherwise second piece, or both first and second pieces already pre-connected to the adapter, thereby creating respectively a two-piece spacer or a three-piece spacer. A spacer is therefore defined as a combined structure of the adapter and at least one piece of steel, whereas the adapter is connected to at least one piece of steel.

A possible use of such transition pieces is that thousands of welds could be prepared in advance. When leakages occur in the plant, installing the at least partially friction welded DMW transition parts would only require a classic or similar weld (i.e. welding two similar steels such as e.g. M-M or A-A where M stands for martensitic steel and A representing austenitic stainless steel) at each martensitic respectively austenitic tube end. The problems of DMW stated above do not exist for similar welds.

The invention further provides for a method for connecting by use of welding a first piece made of martensitic steel to a second piece made of austenitic stainless steel, however in an indirect way, wherein the method comprises the steps of (i) welding the first piece to one side of a two-sided adapter, made of e.g. EPRI P87 alloy, A617 alloy or else A82 alloy, and possibly additive manufactured; and (ii) welding the second piece to the other side of the two-sided adapter, wherein for at least one of the welding steps friction welding is used, while the other welding step could be e.g. laser beam welding.

The invention also considers a system, comprising: a two-sided adapter, made of a Ni-based alloy, connected to either a first piece of steel and/or to a second piece of steel, wherein the first and second piece differ in at least one chemical or physical parameter; wherein the connection of the first or the second piece with the adapter is characterized in that it is made by use of additive manufacturing.

According to an embodiment, the first piece of material of this system is made of martensitic steel, more in particular CSEF (Creep Strength Enhanced Ferritic Steels) whereas the second piece of material of the system is made of austenitic steel, more in particular advanced stainless steels (such as e.g. Super304H, HR3C, 347HFG).

Moreover, according to an embodiment of the invention, the Ni-based alloy described for the system above, is made of EPRI P87 alloy. According to another embodiment, the Ni-based alloy is made of A617 alloy, or alternatively the Ni-based alloy is made of A82 alloy.

In addition, the invention further includes a method for linking a first piece of steel to a second piece of steel, wherein the first and second piece differ in at least one chemical or physical parameter, the method comprises the steps of (i) providing a connection between the first piece and one side of a two-sided adapter, made of an Ni-based alloy; and (ii) providing a connection between the second piece and the other side of the two-sided adapter, wherein for one of the steps (i) or (ii) additive manufacturing is used, whereas for the other step (ii) or (i) friction welding is performed.

With respect to this method, the first piece of material is e.g. made of martensitic steel, more in particular CSEF (Creep Strength Enhanced Ferritic Steels) and/or the second piece of material is e.g. made of austenitic steel, more in particular advanced stainless steels (such as e.g. Super304H, HR3C, 347HFG).

In the above consideration, focus was given to the difference in at least one chemical or physical parameter, and more in particular to the thermal expansion coefficient, as this including carbon migration were the problems to be considered when using welding as connecting technique. However to choose to work with pieces of steel being different, originates typically from the used context, for instance a power plant and more in particular the component within that power plant. The connecting problem occurs while connecting the components within such power plant. It is hence worth pointing out that the choice of joining different materials is not a free academic choice but a technical necessity, originating from the components function. Therefore typically the materials differ in more than one chemical or physical parameter.

An example of the above is in the use of advanced martensitic and advanced austenitic stainless steels, that are characterized by respectively improved creep, and corrosion and oxidation resistance on the other hand. Whereas corrosion typically occurs on the outside, oxidation is taking place on the inside of the power installation parts. Martensitic steel is mainly used for the collectors or so-called headers of the power installation. The 9% Cr is also common for the grades P91 and P92 improved version, including further elements such as e.g. molybdenum, vanadium, niobium, boron, tungsten or nitrogen to better withstand creep, and occurring more often in modern boiler systems. Alternatively, VM12 can also be mentioned as a useful martensitic steel type. Austenitic stainless steel is particularly used in so-called super heaters and re-heaters, wherein higher temperatures and far more aggressive environment are present. Mainly due to the higher Cr-alloying, i.e. typically 18-25%, possibly up to 35%, the austenitic material is better performing in this strong corrosive area. Metal temperatures here may arise up to 650-680° C., whereas currently operating steam temperature of 600° C. is applied.

In the above exemplary embodiments a Ni-based alloy, made of EPRI P87 alloy, is put forward as a possible solution. According to other possible embodiments, the Ni-based alloy is made of A617 alloy, or alternatively of A82 alloy.

In more general terms the two-sided adapter alloy preferably has a Cr percentage and/or C percentage and preferably both close to those of one of the pieces of materials to be connected to, while the other piece of material differs substantially in Cr percentage. The alloy especially has an extra component, such as Ni, at least partially preventing the C migration from the first to the second piece of different material.

It is noted that the basic principle according to the present invention of a (partially) friction welded adapter applied onto dissimilar metal welds, is not only applicable for USC power plants, but also includes for example concentrated solar power systems, nuclear installations, and gas turbines amongst other possible application areas, wherever extreme high temperatures occur and therefore the limits of classical or standard materials are reached, leading to the forced nature of having to deal with dissimilar metal welding of advanced materials with less advanced materials.

DETAILED DESCRIPTION OF THE DRAWINGS

In accordance with the prior-art, FIG. 1 illustrates a direct joining system 100, connecting two different types of steel 101, 102, and wherein the connecting mechanism is determined by means of friction welding. Hence, the connection made between the two different types of steel is a friction welded contact 103. For the prior-art example illustrated the different steel types are martensitic steel 101 and austenitic stainless steel 102.

The prior-art as illustrated in FIG. 1 is now compared with several embodiments according to the present invention.

In an alternative aspect of the invention, following improvements of direct joining through friction welding are provided. First, the temperature during friction welding is lowered such that a 'weld' rather than a 'lack of fusion' is realized. With a weld the materials are connected smoothly, whereas with a so-called lack of fusion there is an abrupt change from one material to the other. Moreover having a decrease in temperature applied, the martensitic steel will represent slightly lower hardness, leading to less rigid or more flexible constructions. Further, a specific joint type is determined meaning that a certain position and angle is chosen for the surfaces to be welded. The edge of a tube or pipe end for instance is not cut perpendicularly with respect to the tube or pipe axis, but under a certain angle, and hence less material is present at the outer edge side compared to the inner edge side, or vice versa. When the two different materials, particularly martensitic steel and austenitic stainless steel according to the invention, are brought together to be friction welded, there is less material present in the joint area than if a perpendicular cut is performed. In other words, there is less abundance or too much of material where the weld is made. A low penetration or low protrusion weld is thus achieved. Finally, in order to have slightly lower hardness of the martensitic steel—and hence less brittle material—an induction coil can be mounted onto the martensitic steel. Through electromagnetic radiation of the induction coil, the martensitic steel will become 'softer' and less brittle. This reduction in Vickers hardness of martensitic steel, having become untempered due to local high temperatures induced by the friction welding process, is alternatively obtained by PWHT or automatically after e.g. more than 500 h of service. The induction coil method however is interpreted as being beneficial because of the local application of the method resulting in only local effect of this method, and hence not deteriorating or degrading other parts of the connecting system.

Figure 2:
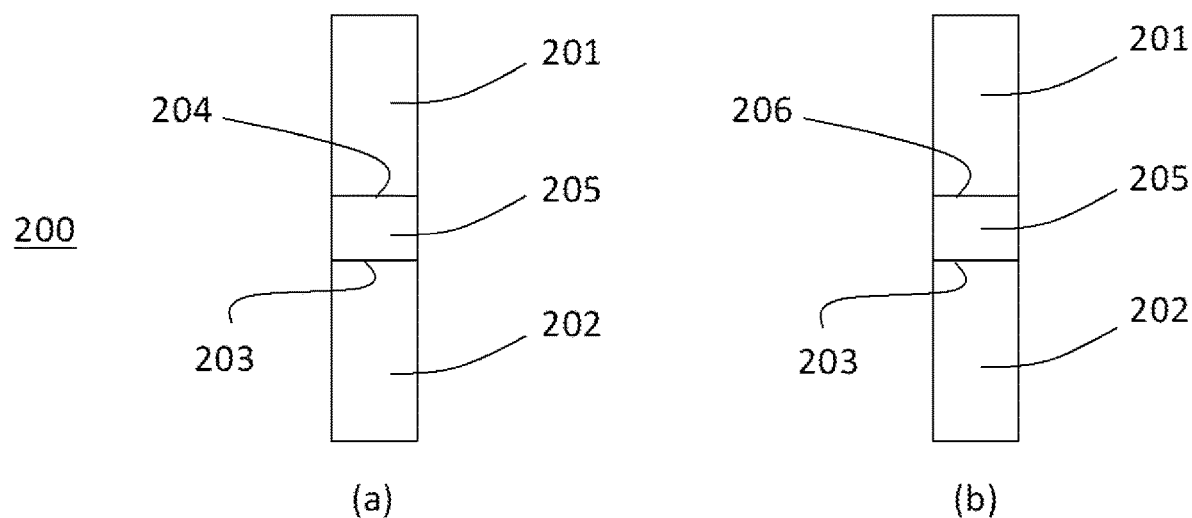
FIG. 2 illustrates a connecting system in accordance with the present invention (a) comprising martensitic steel, onto which a Ni-alloy is laser beam welded, wherein the Ni-alloy is subsequently friction welded to austenitic stainless steel, (b) comprising martensitic steel, onto which a Ni-alloy is grown by means of additive manufacturing, and wherein that Ni-alloy is subsequently friction welded to austenitic stainless steel.

In FIG. 2, a connecting system 200 in accordance with the present invention is depicted. The connecting system of FIG. 2 is characterized by a three-part structure, wherein again two different types of steel 201, 202 can be distinguished, moreover an intermediate part 205 between both is now also shown. This intermediate part 205, further referred to as two-sided adapter is defined as a Ni-based alloy, particularly chosen to link or indirectly connect a martensitic 201 with an austenitic stainless steel 202. With the Ni-based alloy 205 as intermediate between the martensitic 201 and the austenitic stainless steel 202, carbon migration from lower Cr-alloyed steel, e.g. 9% Cr martensitic, to higher Cr-alloyed steel, e.g. 18-25% Cr advanced austenitic, is reduced or even eliminated. According to an embodiment of the invention, as illustrated in FIG. 2(a), the Ni-based alloy 205, is connected to each one of the different types of steel 201, 202, though in a rather different way. However both connections 203, 204 are welding connections, the welding connection 204 with martensitic steel 201 is realized by laser beam welding the Ni-based alloy 205 onto the martensitic steel 201. In this particular case, the Ni-based alloy 205 is for example provided as a wire being targeted by a laser beam, thereby melting the wire and applying the melted alloy directly onto the martensitic steel 201. The welding connection 203 between the Ni-based alloy 205 and the austenitic stainless steel 202 is obtained by friction welding. As shown in FIG. 2(b), according to other embodiment of the invention, a Ni-based alloy 205 is grown by means of additive manufacturing onto a martensitic steel 201, forming a fixed grown connection 206 defined by this additive manufacturing. A friction welding connection 203 is provided between the Ni-based alloy 205 and an austenitic stainless steel 202.

FIG. 3 illustrates a connecting system 300 in accordance with the present invention, again characterized by a three-part structure, however in this case both connections 303, i.e. with martensitic steel 301 at one side of the two-sided adapter, and with austenitic stainless steel 302 at the other side of the two-sided adapter, are obtained by friction welding. The two-sided adapter 305 depicted here, is a Ni-based alloy, such as e.g. P87, A617 or else A82, being made in advance by additive manufacturing. The additive manufactured two-sided adapter 305 is brought into a set-up to friction weld both sides with either martensitic steel and austenitic stainless steel respectively. Whereas the steel parts 301, 302 are typically delivered as tubes or pipes, the additive manufactured two-sided adapter is made and placed in the welding set-up as a ring shape or donut shaped three-dimensional model.

According to an alternative embodiment (not depicted in FIG. 3) the additive manufactured two-sided adapter 305 is only at one side friction welded to a piece of steel 301, 302. Typically in this case, the martensitic steel 301 is chosen to be friction welded to the two-sided adapter 305, as being more critical in welding applications compared to austenitic stainless steel 302. A two-piece structure is now formed, having a martensitic steel end on one side, and a Ni-based alloy adapter end on the other side. Both ends can be further subject for conventional welding on site, i.e. respectively the martensitic steel end with martensitic steel being part of a power plant, and the Ni-based alloy adapter end with austenitic stainless steel being part of a power plant.

Referring back to the prior-art, FIG. 4 illustrates a direct joining method 410 for connecting, more particularly friction welding two different types of steel, characterized by the steps of:
  bringing a martensitic steel 101 in a friction welding set-up, being represented by 411
  bringing an austenitic stainless steel 102 in a friction welding set-up, being represented by 412
  friction welding the martensitic steel 101 to the austenitic stainless steel 102, being represented by 413

While referring to a connecting system 200 as depicted in FIG. 2, a connecting method 510, 520 in accordance with the present invention is illustrated in FIG. 5. The connecting method 510, 520 representing one connecting means determined by friction welding, is further defined by either a connecting means using laser beam welding, or else applying additive manufacturing by growing one material onto the other. More specifically, as shown in FIG. 5(a), the connecting method 510 comprises the steps of:
- bringing a martensitic steel 201 in a welding set-up, being represented by 511
- bringing a Ni-based alloy 205 in a welding set-up, being represented by 514
- laser beam welding the Ni-based alloy 205 onto the martensitic steel 201, being represented by 515
- bringing an austenitic stainless steel 202 in a welding set-up, being represented by 512
- friction welding the Ni-based alloy 205 to the austenitic stainless steel, being represented by 513

The Ni-based alloy 205 mentioned above, is e.g. EPRI P87 alloy, alternatively A617 alloy or else A82 alloy.

The connecting method 520 depicted in FIG. 5(b), is characterized by the steps of:
- bringing a martensitic steel 201 in an additive manufacturing set-up, being represented by 521
- bringing a Ni-based alloy 205 in an additive manufacturing set-up, being represented by 524
- additive manufacturing the Ni-based alloy 205 directly onto the martensitic steel 201, being represented by 526
- bringing the martensitic steel 201, with additive manufactured Ni-based alloy 205 in a welding set-up, being oriented such that the Ni-based alloy side is to be welded, being represented by 527
- bringing an austenitic stainless steel 202 in a welding set-up, being represented by 522
- friction welding the additive manufactured Ni-based alloy 205 (onto the martensitic steel 201) to the austenitic stainless steel 202, being represented by 523

Further, another connecting method 610, in accordance with the present invention, and only applying friction welding as a connecting means, is illustrated by FIG. 6, comprising the steps of:
- additive manufacturing a Ni-based alloy 305, being represented by 615
- bringing a martensitic steel 301 in a welding set-up, being represented by 611
- bringing the additive manufactured Ni-based alloy 305 in a welding set-up, being represented by 614
- friction welding the additive manufactured Ni-based alloy 305 to the martensitic steel 301, being represented by 618
- bringing the martensitic steel 301, onto which the additive manufactured Ni-based alloy 305 is friction welded, in a welding set-up, being oriented such that the Ni-based alloy side is to be welded, being represented by 619
- bringing an austenitic stainless steel 302 in a welding set-up, being represented by 612
- friction welding the additive manufactured Ni-based alloy 305 (friction welded onto the martensitic steel 301) to the austenitic stainless steel 302, being represented by 613

In addition to the various embodiments for connecting system and method as described above, corresponding transition pieces or so-called spacers to easily install as a replacement in a power plant are also part of the present invention.

According to embodiment of the present invention, the transition piece 730 of FIG. 7(a) is a two-piece spacer comprising of a martensitic steel 731 that is connected to a Ni-based alloy 735. Alternative but less common two-piece spacer embodiment comprises an austenitic stainless steel connected (e.g. by means of friction welding) to a Ni-based alloy. Further, another embodiment according to present invention is described by FIG. 7(b), illustrating a three-piece spacer 740 comprising of a martensitic steel 741, connected to a Ni-based alloy 745, subsequently connected to an austenitic stainless steel 742.

As is schematically shown in FIG. 8, a transition piece 840 in accordance with the present invention can be installed as a tube connection. Depicted in FIG. 8 is part of a power plant tube in martensitic steel 801, that is conventionally welded onto the martensitic side of a three-piece spacer tube 840, comprising of a martensitic steel 841, connected to a Ni-based alloy 845, subsequently connected to an austenitic stainless steel 842. Onto its other austenitic side, the three-piece spacer tube 840 is conventionally welded to part of a power plant tube in austenitic stainless steel 802. The tube wall of the different parts mentioned, has a thickness of preferably between 3 and 15 mm, more preferably between 4 and 10 mm, whereas the outer diameter of the tubular parts is for instance 50-60 mm.

According to another alternative embodiment, larger dimensions are also applicable. For example shifting rather towards pipe configurations instead of tube systems, wall thicknesses of 40 mm can occur and diameters of about 220 mm are more likely.

Figure 9:
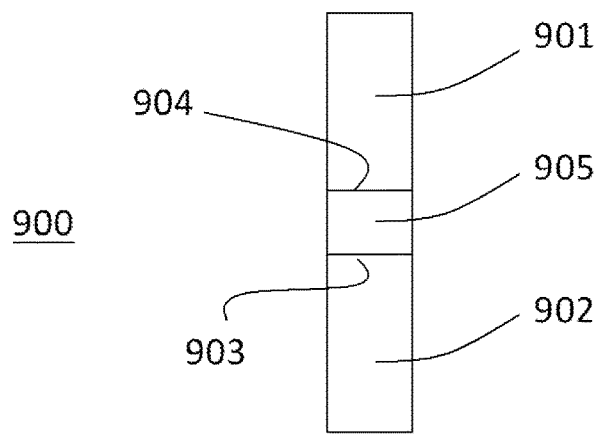
FIG. 9 illustrates a connecting system in accordance with the present invention comprising austenitic steel, onto which a Ni-alloy is either laser beam welded or grown by additive manufacturing, wherein the Ni-alloy is subsequently friction welded to another and different Ni-alloy.

FIG. 9 illustrates a further embodiment, particularly referring to the application within e.g. a nuclear installation instead of a USC power plant, wherein different types of materials can appear compared to examples previously discussed. A connecting system 900 in accordance with the present invention is represented, comprising austenitic steel 901, onto which a Ni-based alloy 905, such as for instance A52 alloy, is either laser beam welded or grown by additive manufacturing, wherein the Ni-based alloy 905 is now acting as a two-sided tubular adapter which is subsequently friction welded to another and different type of Ni-based alloy 902, such as e.g. A690 alloy in case of nuclear power plants. Alternatively, according to a variation of this embodiment, the two-sided adapter Ni-based alloy 905, A52 alloy in particular, is additive manufactured in advance, and hence friction welded onto its two sides 903, 904 respectively with austenitic steel 901 onto one side 904, and with another different Ni-based alloy 902 onto the other side 903. Furthermore, Haynes 230 can also be mentioned as possible other Ni-based alloy 902, onto which a Ni-based alloy adapter 905 is connected, to be typically used at high temperatures, such as occurring in the Concentrated Solar Power (CSP) plants.

Figure 10:
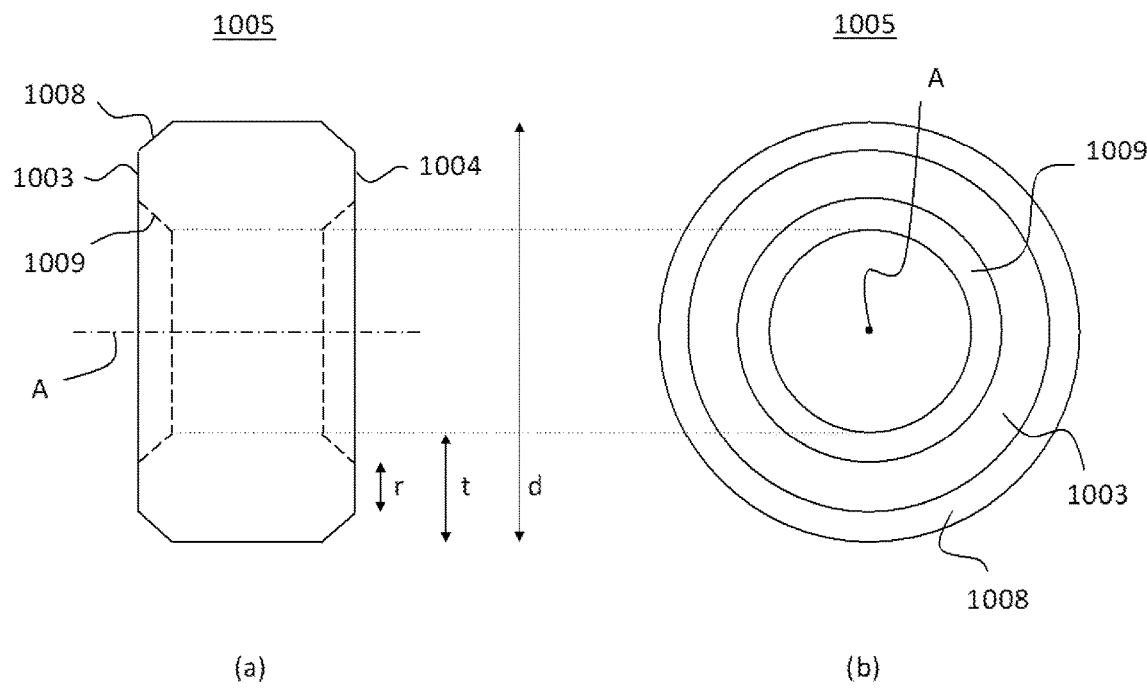
FIG. 10 illustrates a tubular two-sided adapter, shaped with edges in (a) side view, (b) front view, in accordance with the present invention.

As mentioned before, the edge of a tube or pipe end is not necessarily cut perpendicularly with respect to the tube or pipe axis, but possibly under a certain angle. Moreover, according to an embodiment of the present invention, a two-sided tubular adapter 1005 is shaped with edges 1008, 1009, as for example illustrated in FIG. 10. Particularly with the side view of FIG. 10(a) it is shown that less material is present at tubular ends 1003, 1004, due to occurring edges 1008, 1009 onto respectively the outer and inner ring of a donut alike shape 1005, further represented by the front view of FIG. 10(b). The dashed lines in FIG. 10(a) suggest the presence of the donut inner ring and its corresponding edge, although not being visible in side view. The concentric circles in FIG. 10(b) represent the borders of an edge-shaped tubular end 1003, wherein the most inner circle also defines the border of the donut hole. The light dotted lines in FIG. 10 further relate to the presence of the donut hole. When friction welding 2 pieces, here particularly 2 tubular ends, these ends are physically brought together and material of both ends is fused, while due to rotating motion centrifugal forces are acting on at least one of the tubular surface ends, pushing material away from the tube's central axis A, depicted as dash-dotted line in FIG. 10(a). In other words, the more material is present at the tubular surface ends, the more material will be driven away by centrifugal forces towards the outer surface of the tubular shapes, during the friction welding process. Hence, by removing material from the tubular surface ends, by e.g. cutting off edges, a reduced tube wall thickness with less material is achieved at the surface ends. Using edge-shaped ends provided onto a tubular adapter, and onto which surfaces 1003, 1004 the friction welding can take place, may result into the advantage of creating an improved weld with less excess material or no large irregularities at the weld surface to be corrected afterwards.

Particular edge designs may be more beneficial than others in accomplishing the best possible weld under specific friction welding circumstances and characteristics accordingly. FIG. 11 illustrates so-called joint configurations or joint types of tubes, meaning several tube wall profile architectures, particularly considered at surface ends to be friction welded, amongst which FIG. 11(b) is another zoomed-in representation of what has been described above for FIG. 10. Tube profile dimensions are determined by tube diameter d, wall thickness t and reduced wall thickness r, as illustrated in FIG. 10(a), 11(a), 11(b). As an example, tube diameter d is for instance in the range of 20-500 mm, wall thickness t in the range of 3-25 mm and reduced wall thickness in the range of 2-20 mm. Besides the reduced wall thickness r, the edges are also characterized by an angle α and/or another angle β, which may be different or equal in order of magnitude, and by a respective length 1α and/or 1β. The tubular surface end 1003, 1004 as in FIG. 10, characterized by reduced wall thickness r, is not necessarily perfectly centred, while considering inner and outer diameter of the tubular shape, but can also be positioned more to the inner of more to the outer ring edge, depending e.g. on the angles α, β chosen, or on the dimensions of the contact surface 1003, 1004 required. An angle γ of e.g. 45° may determine an oblique cut off surface end as in FIG. 11(c) further reduced in material by an angle α, δ. A measure for the reduced wall thickness here is given by height h.

The basic principle according to the present invention of a (partially) friction welded adapter applied onto dissimilar metal welds could also be applied in combination with forging (or re-forging) methods. FIG. 12 schematically shows an alternative of the present invention basic principle combined with respectively forging (or re-forging) and piercing process. In FIG. 12(a) a connecting system 1200 is depicted characterized by means of friction welding a first bar or rod like piece 1201 with a second bar or rod like piece 1202. The first bar 1201 is for instance made of martensitic steel, whereas the second bar 1202 is possibly a Ni-based alloy. After friction welding both bars 1201, 1202, the connecting system 1200 is subsequently brought into a forging (or re-forging) process, during which the materials of the connecting system 1200 are plastically deformed under high temperature conditions, and by using a hydraulic press in order to deform the bar structure to a sheet like— possibly circular/cylindrical—component 1200' comprising of two disc-parts 1202', 1201' originating from the two friction welded bars 1202, 1201. The result of the forging (or re-forging) process is shown in FIG. 12(b). In order to achieve a ring or donut shape, the sheet like component can be hollowed consecutively, piercing out a central part, for example by means of using a hydraulic press. As a result, the tubular or ring like structure 1200" of FIG. 12(c) comprising of two ring-parts 1202", 1207" is obtained. Hence, an alternative though 'quick and less alignment sensitive' method for creating a two-piece spacer, as earlier described e.g. by FIG. 7(a), is given.

Moreover, the two bars, each made of one particularly type of steel or metal are chosen for this combined friction welding and forging (or re-forging) process, followed by a piercing process. This 'quick and less alignment sensitive' connecting method eliminates alignment difficulties that may occur when friction welding hollow tubes, whereas the tolerances on the alignment in case of using bars are omitted, allowing much more flexibility in the connecting process. Theoretically however, one of the bars may comprise a first part of a first type of metal and a second part of a second type of metal, wherein first and second parts are previously connected by means of e.g. laser beam welding or additive manufacturing.

According to an embodiment of the present invention, three bars are friction welded and subsequently forged (or re-forged) and pierced afterwards, such that a 3-layered ring-shaped stack is achieved, for example resulting in a three-piece spacer as referred to in FIG. 7(b). However, being a 'quick and less alignment sensitive' solution in shape, this alternative embodiment may be associated with complex and cumbersome after treatments for accomplishing for instance the right physical and chemical characteristics.

It is noted that the present invention of (partially) friction welded adapter applied in combination with the aspect of dissimilar metal welds, is not limited to the examples of austenitic steel and martensitic steel using a Ni-base alloy adapter, or bainitic steel and martensitic steel using a Ni-based alloy adapter, or either austenitic steel and a Ni-based alloy using another Ni-based alloy, but includes other possible combinations of metals, particularly enabling welding constructions of advanced with less advanced materials to be operative at high temperature conditions.

The invention claimed is:

1. A method for preparing a three-piece spacer for connecting dissimilar metals, the three-piece spacer consisting of a first piece, a two-sided adapter connected to the first piece on a first side of the two-sided adapter, and a third piece connected to a second side of the two-sided adapter opposite the first side, the method comprising:
   preparing a two-piece spacer consisting of the first piece and the two-sided adapter; and
   welding the third piece to the second side of the two-sided adapter of the two-piece spacer to obtain the three-piece spacer,
wherein:
   the first piece is a tubular piece of a first metal, the first metal having a first chromium content;
   the two-sided adapter consists of a tubular piece of a nickel-based alloy, the nickel-based alloy having a second chromium content;
   the third piece is a tubular piece of a second metal, the second metal having a third chromium content;
   the second chromium content is equal to either the first chromium content or the third chromium content;
   the first chromium content is different from the third chromium content; and
   either (1) or (2) applies to the method, or both (1) and (2) apply to the method:
   (1) the two-piece spacer is prepared by rotational friction welding of the first piece and the two-sided adapter;

(2) the third piece is welded to the two-piece spacer by rotational friction welding.

2. The method of claim 1, wherein the two-piece spacer is prepared by rotational friction welding of the first piece and the two-sided adapter.

3. The method of claim 1, wherein the third piece is welded to the two-piece spacer by rotational friction welding.

4. The method of claim 1, wherein:
the two-piece spacer is prepared by additive manufacturing the nickel-based alloy onto an end of the first piece; and
the third piece is welded to the two-piece spacer by rotational friction welding.

5. The method of claim 1, wherein:
the two-piece spacer is prepared by laser beam welding of the first piece and the two-sided adapter; and
the third piece is welded to the two-piece spacer by rotational friction welding.

6. The method of claim 1, wherein:
the two-piece spacer is prepared by rotational friction welding of the first piece and the two-sided adapter; and
the third piece is welded to the two-piece spacer by laser beam welding.

7. The method of claim 1, wherein:
the two-piece spacer is prepared by rotational friction welding of the first piece and the two-sided adapter; and
the third piece is welded to the two-piece spacer by rotational friction welding.

8. The method of claim 1, wherein the first metal and the second metal are steels.

9. The method of claim 1, wherein the first metal or the second metal is a martensitic steel.

10. The method of claim 9, wherein the Ni-based alloy is EPRI P87 alloy, A617 alloy, or A82 alloy.

11. The method of claim 1, wherein the first metal or the second metal is an austenitic steel.

12. The method of claim 11, wherein the Ni-based alloy is EPRI P87 alloy, A617 alloy, or A82 alloy.

13. The method of claim 12, wherein:
the first metal is a martensitic steel; and
the second metal is an austenitic steel.

14. The method of claim 1, wherein:
the first metal is a martensitic steel; and
the second metal is an austenitic steel.

15. The method of claim 1, wherein:
the first metal is an austenitic steel; and
the second metal is a martensitic steel.

16. The method of claim 1, wherein:
the first metal is an austenitic steel; and
the second metal is a second nickel-based alloy differing from the nickel-based alloy of the two-sided adapter.

17. The method of claim 1, wherein:
the first metal is a martensitic steel;
the first chromium content is from 8% to 13% by weight;
the second metal is an austenitic steel; and
the third chromium content is from 17% to 35% by weight.

18. The method of claim 1, wherein:
the first metal is a martensitic steel;
the first chromium content is from 8% to 13% by weight;
the second metal is an austenitic steel;
the third chromium content is from 17% to 35% by weight; and
the Ni-based alloy is EPRI P87 alloy, A617 alloy, or A82 alloy.

19. The method of claim 1, wherein the two-sided tubular adapter has a ring shape or a donut shape and the first piece and the second piece are hollow tubes.

20. The method of claim 1, wherein the third piece is welded to the two-piece spacer by rotational friction welding, the method further comprising:
providing end surfaces on the second side of the two-sided tubular adapter prior to welding the third piece, wherein the end surfaces are not perpendicular with respect to a longitudinal axis of the two-sided adapter.

\* \* \* \* \*